United States Patent
Kurashige et al.

(10) Patent No.: US 8,433,882 B2
(45) Date of Patent: Apr. 30, 2013

(54) DISK ARRAY CONTROL DEVICE AND STORAGE DEVICE

(75) Inventors: Takehiko Kurashige, Ome (JP); Junji Yano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 103 days.

(21) Appl. No.: 13/157,011

(22) Filed: Jun. 9, 2011

(65) Prior Publication Data

US 2011/0238913 A1    Sep. 29, 2011

Related U.S. Application Data

(63) Continuation of application No. 12/485,686, filed on Jun. 16, 2009, now abandoned.

(30) Foreign Application Priority Data

Oct. 29, 2008    (JP) ................................. 2008-278646

(51) Int. Cl.
*G06F 12/00* (2006.01)

(52) U.S. Cl.
USPC ................................ 711/215; 711/2; 711/114

(58) Field of Classification Search ............... 711/2, 114, 711/215
See application file for complete search history.

(56) References Cited

U.S. PATENT DOCUMENTS

| | | | |
|---|---|---|---|
| 5,802,264 A | 9/1998 | Chen et al. | |
| 5,812,814 A | 9/1998 | Sukegawa | |
| 5,887,164 A * | 3/1999 | Gupta | 713/2 |
| 6,065,096 A | 5/2000 | Day et al. | |
| 6,233,108 B1 | 5/2001 | Inoue | |
| 6,728,833 B2 * | 4/2004 | Pruett et al. | 711/114 |
| 6,772,108 B1 * | 8/2004 | Stolowitz | 703/27 |
| 7,042,664 B2 * | 5/2006 | Gill et al. | 360/31 |
| 7,383,380 B2 | 6/2008 | Yagisawa et al. | |
| 7,558,915 B2 * | 7/2009 | Cherian et al. | 711/114 |
| 2003/0105922 A1 | 6/2003 | Tomita | |

(Continued)

FOREIGN PATENT DOCUMENTS

| | | |
|---|---|---|
| JP | 5-204554 | 8/1993 |
| JP | 07-200191 | 8/1995 |

(Continued)

OTHER PUBLICATIONS

Definition of Drive, The Free Dictionary, www.thefreedictionary.com 2009.

(Continued)

*Primary Examiner* — Reginald Bragdon
*Assistant Examiner* — Gurtej Bansal
(74) *Attorney, Agent, or Firm* — Blakely, Sokoloff, Taylor & Zafman LLP (57) ABSTRACT

According to one embodiment, a disk array control device manages a plurality of drives as a single logical drive. The disk array control device includes a first register configured to store a to-be-accessed drive number which is designated by a host, and a control module. The control module is configured to receive a command from the host, determine whether the received command is a predetermined command which is used for maintenance of each of the drives, and execute, in a case where the received command is the predetermined command, a pass-through process of sending the received command to the drive which is designated by the to-be-accessed drive number in the first register.

14 Claims, 9 Drawing Sheets

U.S. PATENT DOCUMENTS

| | | |
|---|---|---|
| 2004/0230698 A1 | 11/2004 | Oeda et al. |
| 2005/0086557 A1 | 4/2005 | Sato et al. |
| 2005/0268132 A1 | 12/2005 | Yun et al. |
| 2007/0067563 A1* | 3/2007 | Smith et al. .................. 711/114 |
| 2009/0077547 A1* | 3/2009 | Kakinoki ...................... 717/168 |
| 2010/0106905 A1 | 4/2010 | Kurashige et al. |

FOREIGN PATENT DOCUMENTS

| | | |
|---|---|---|
| JP | 07-295761 | 11/1995 |
| JP | 09-044317 | 2/1997 |
| JP | 11-184643 | 9/1997 |
| JP | 10333841 | 12/1998 |
| JP | H11-306644 | 11/1999 |
| JP | 2000-056935 | 2/2000 |
| JP | 2001518657 | 10/2001 |
| JP | 2003316525 | 11/2003 |
| JP | 2004185477 | 7/2004 |
| JP | 2004325939 | 11/2004 |
| JP | 2005100259 | 4/2005 |
| JP | 2005235384 | 9/2005 |
| JP | 2007501987 | 2/2007 |
| JP | 2007188372 | 7/2007 |
| JP | 2009-508192 | 2/2009 |
| WO | 9917190 | 4/1999 |
| WO | WO 2007-024740 | 3/2007 |

OTHER PUBLICATIONS

U.S. Appl. No. 12/485,686, Non-Final Office Action, mailed Mar. 12, 2010.
U.S. Appl. No. 12/485,686, Final Office Action, mailed Jul. 2, 2010.
U.S. Appl. No. 12/485,686, Non-Final Office Action, mailed Nov. 8, 2010.
U.S. Appl. No. 12/485,686, Final Office Action, mailed Mar. 9, 2011.
Japanese Patent Application No. 2009-243592, Notice of Reasons for Rejection, mailed Oct. 25, 2011, (with English Translation).
Japanese Patent Application No. 2009-243592, Decision of Rejection, mailed Jan. 24, 2012, (with English Translation).

* cited by examiner

Page A0h

| Byte | Description |
|---|---|
| 0 | Drive select register<br>　bit7　　　=0:RAID, =1:ATA drive<br>　bit6-0　　ATA drive number |
| 1 | Page select register |
| 2 | Pass-through mode (PMT) register<br>　00h　　　Log page mode<br>　01h　　　Start read data mode<br>　02-FEh　Reserved<br>　FFh　　　Pass-through mode |
| 3-511 | Reserved |

FIG. 4

| PTM mode register (Byte 2) | Drive select register(Byte 0) | | Access destination | Command |
|---|---|---|---|---|
| | Bit7 | Bit6-0 | | |
| ≠FFh | 0 | | RAID controller | DOWNLOAD MICROCODE |
| | 1 | k | Device k | |
| =FFh | | k | Device k | All commands |

FIG. 5

Pass-through control for smart command

| PTM mode register (Byte 2) | Page designated by smart command | Drive select register(Byte 0) | | Access destination | Page select register (Byte 1) | PTM mode register (Byte 2) | Command which is output to device |
|---|---|---|---|---|---|---|---|
| | | Bit7 | Bit6-0 | | | | |
| ≠FFh | ≠A1h | | | RAID controller | | | |
| | =A1h | | k | Device k | j | Log page mode(00h) | SMART READ LOG Page j |
| | | | | | | SMART READ DATA mode (01h) | SMART READ DATA |

DISK ARRAY CONTROL DEVICE AND STORAGE DEVICE

CROSS-REFERENCE TO RELATED APPLICATIONS

This application is a continuation application of U.S. patent application Ser. No. 12/485,686, filed Jun. 16, 2009, abandoned, which is based upon and claims the benefit of priority from Japanese Patent Application No. 2008-278646, filed Oct. 29, 2008, the entire contents of which are incorporated herein by reference

BACKGROUND

1. Field

One embodiment of the present invention relates to a disk array control device which manages a plurality of drives as a single logical drive, and a storage device including the disk array control device.

2. Description of the Related Art

In recent years, in an information processing apparatus such as a server or a personal computer, use is made of a disk array control system such as a redundant array of inexpensive disks (RAID).

The disk array control system is a system which handles a plurality of drives, such as hard disk drives, as a single logical drive. In the disk array control system, data is distributively written in a plurality of drives in units of a data block. Accordingly, the performance of data write and read can be improved.

Jpn. Pat. Appln. KOKAI Publication No. 2007-188372 discloses a disk array controller which controls an array disk that comprises a plurality of disk drives. In order to make it possible to update the firmware of each disk drive, the disk array controller includes a memory module which stores a flag designating whether the plural disk drives are used as an array disk or are used as unit disk drives. In the case where the flag is "1", the disk array controller executes a process for array-controlling the plural disk drives. On the other hand, in the case where the flag is "0", the disk array controller enables a system apparatus to access each disk drive as a unit disk drive.

In the disk array controller of Jpn. Pat. Appln. KOKAI Publication No. 2007-188372, however, in the case where the flag is "0", no process for array control is executed, and all commands from the system, which include data read/write commands, are directly sent to a certain disk drive. Thus, if the flag is set to "0" during the operation of the system in which the plural disk drives are array-controlled, the data structure, which is constructed on the array disk, may possibly be destroyed. Consequently, it is practically difficult to update the firmware during the operation of the system.

Therefore, it is necessary to realize a novel function which can execute a process relating to the maintenance of each of the drives even in the state in which the operating system is running.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a disk array control device manages a plurality of drives as a single logical drive. The disk array control device comprises a first register configured to store a to-be-accessed drive number which is designated by a host, and a control module. The control module is configured to receive a command from the host, determine whether the received command is a predetermined command which is used for maintenance of each of the drives, and execute, in a case where the received command is the predetermined command, a pass-through process of sending the received command to the drive which is designated by the to-be-accessed drive number in the first register.

Figure 1:
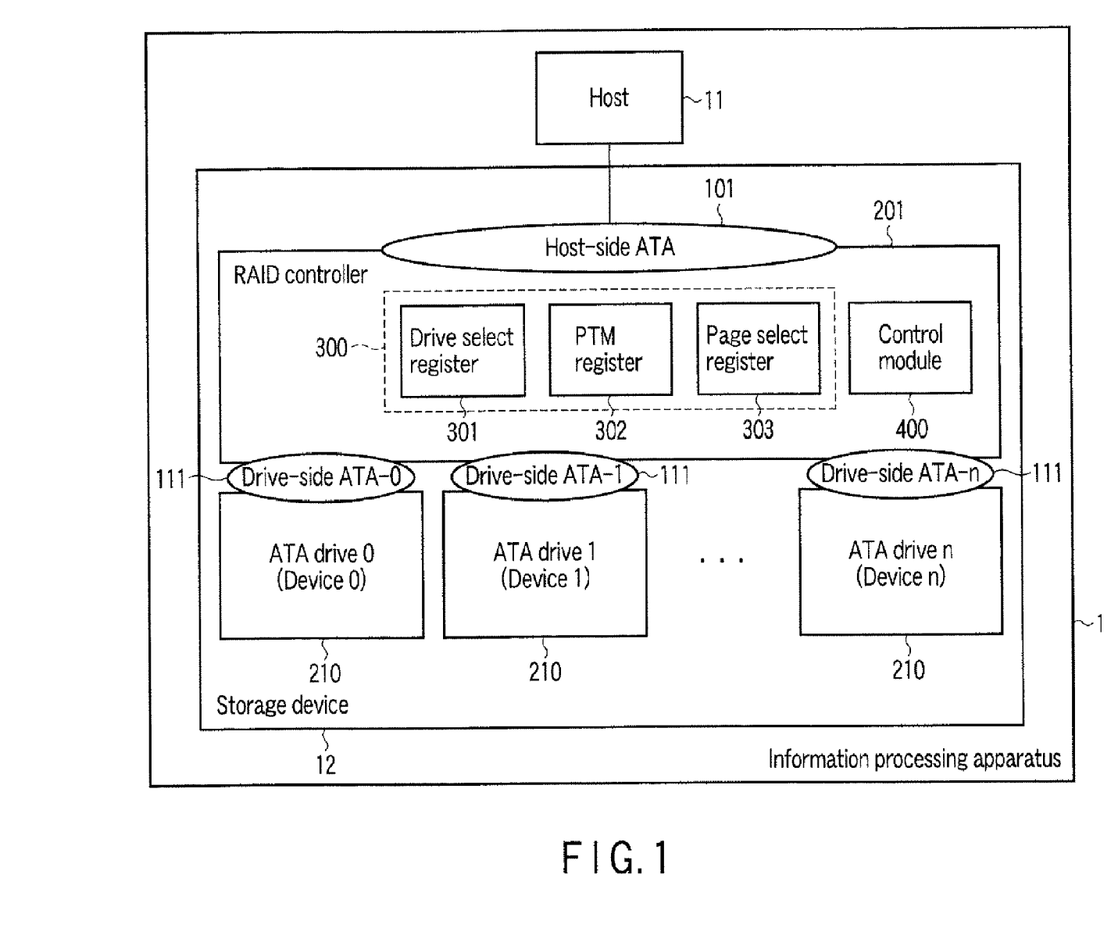
FIG. 1 is an exemplary block diagram showing a structure example of a storage device according to an embodiment of the invention.

To begin with, referring to FIG. 1, a structure example of a storage device according to an embodiment of the invention is described. The storage device is realized as a storage device which supports, e.g. the AT attachment (ATA) standard. This storage device 12 is a drive device which functions as an external storage device of an information processing apparatus 1 such as a server or a personal computer. A host 11 and the storage device 12 are provided in the information processing apparatus main body of the information processing apparatus 1. The host 11 is a core unit of the information processing apparatus 1 and is composed of a CPU which executes various programs, a memory, etc. The storage device 12 is connected to the host 11 via an ATA interface such as a serial ATA interface.

The storage device 12 comprises a RAID controller 201 and a plurality of drives 210. The RAID controller 201 is a disk array controller for handling the plural drives 210 as a single logical drive. In the present embodiment, the RAID controller 201 and an n-number of drives 210 are provided in the housing of the storage device 12. In this case, the number "n" is an integer of 2 or more.

The RAID controller 201 is interposed between the host 11 and the n-number of drives 210. The RAID controller 201 includes a host-side ATA interface 101 and an n-number of drive-side ATA interfaces 111. The RAID controller 201 is connected to the host 11 via the host-side ATA interface 101. In addition, the n-number of drives 210 are connected to the n-number of drive-side ATA interfaces 111 of the RAID controller 201.

Each drive 210 functions as an ATA device that is a drive supporting the ATA standard. Each drive 210 is composed of, for instance, a hard disk drive (HDD) or a solid state drive (SSD). The SSD is a semiconductor disk drive which stores data in a nonvolatile semiconductor memory such as a NAND flash memory.

The RAID controller 201 is a controller for causing the n-number of drives 210 to appear as a single drive to the host 11. Since the RAID controller 201 and the n-number of drives 210 are built in the housing of the storage device 12, the storage device 12 is accessed as a single ATA device from the host 11. In order to improve the data read/write performance, the RAID controller 201 distributes data among the n-number of drives 210. Various RAID levels, such as RAID0, RAID3 and RAID5, are applicable to the RAID controller 210. In the present embodiment, it is assumed that the RAID controller 201 is realized, for instance, as a disk array controller corresponding to RAID0.

The RAID controller 201 has a command pass-through control function for enabling the n-number of drives 210, which are under the control of the RAID controller 201, to be directly accessed from the host 11. For example, the command pass-through control function can directly send (pass-through) only a predetermined command relating to the maintenance of drives from the host 11 to an arbitrary one of the n-number of drives 210. In order to realize this command pass-through control function, the RAID controller 201 includes a pass-through control register 300. The pass-through control register 300 is a register which can be accessed by the host 11 with use of a command that is stipulated in the ATA standard. The pass-through control register 300 is used, for example, in order to store a to-be-accessed drive number which is designated by the host 11.

A control module 400 in the RAID controller 201 is a processor which controls the operation of the RAID controller 201. As illustrated in a flow chart of FIG. 2, the control module 400 receives a command that is sent from the host 11 (block S11). The control module 400 determines whether the received command is a predetermined command which is used for the maintenance of drives (block S12). In the case where the received command is the predetermined command, the control module 400 executes a pass-through process for sending the received command to the drive which is designated by the to-be-accessed drive number that is set in the pass-through control register 300 by the host 11 (block S13). For example, if the host 11 has sent the above-described predetermined command to the storage device 12 in the state in which the to-be-accessed drive number that designates the drive number 0 is set in the pass-through control register 300, the control module 400 of the RAID controller 201 sends the command, which has been received by the host 11, to the drive 210 (ATA drive 0) corresponding to the drive number 0. On the other hand, if the received command is not the predetermined command, for example, if the received command is a data read/write command, the control module 400 executes a RAID control process for executing data read/write among the n-number of drives 210 (block S14).

Figure 2:
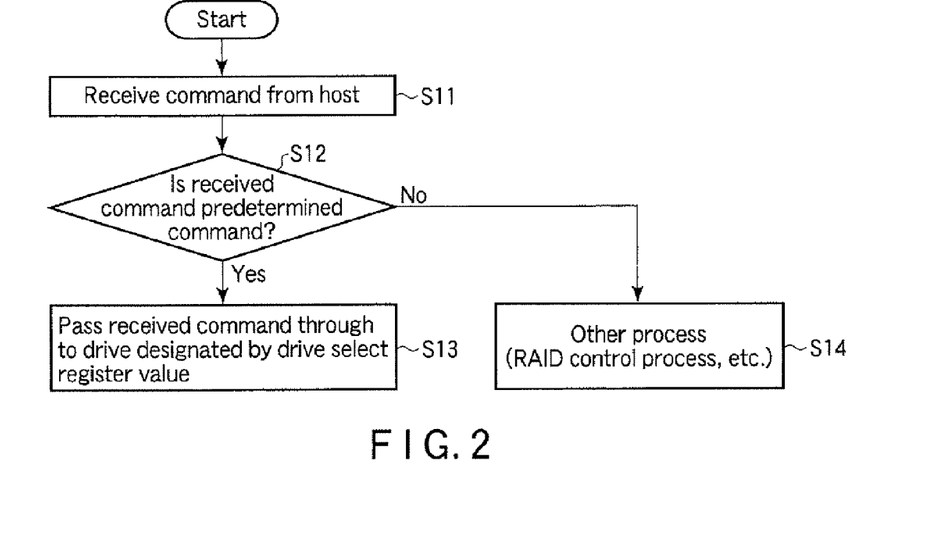
FIG. 2 is an exemplary flow chart illustrating an example of the procedure of a command pass-through control process which is executed by a disk array controller provided in the storage device according to the embodiment.

As the above-described predetermined command, use may be made of a DOWNLOAD MICROCODE command. The DOWNLOAD MICROCODE command is an ATA command which is used in order for the host 11 to alter a microcode (firmware) of the drive.

As the above-described predetermined command, use may also be made of a SMART command. The SMART command is an ATA command for reading or writing a log page structure (SMART information) which is stored in the drive 210.

As has been described above, the command pass-through control function of the present embodiment affects only the operation corresponding to a limited predetermined command, such as a DOWNLOAD MICROCODE command or a SMART command, in the commands from the host 11. Thus, even during the period in which the operating system is being executed in the host 11, the command pass-through control function can be utilized. In other words, even in the state in which the operating system is running, the process (e.g. alteration of the microcode, read/write of log data) relating to the maintenance of each drove can be executed, without affecting the data structure recorded distributively among the n-number of drives 210.

Further, the command pass-through control function of this embodiment has a pass-through mode which sends each of all kinds of commands from the host 11 to the drive which is designated by the to-be-accessed drive number that is set in the pass-through control register 300. This pass-through mode can be used, for example, in order to evaluate the operation of each drive 210 at a time of shipment of the storage device 12.

Figure 3:
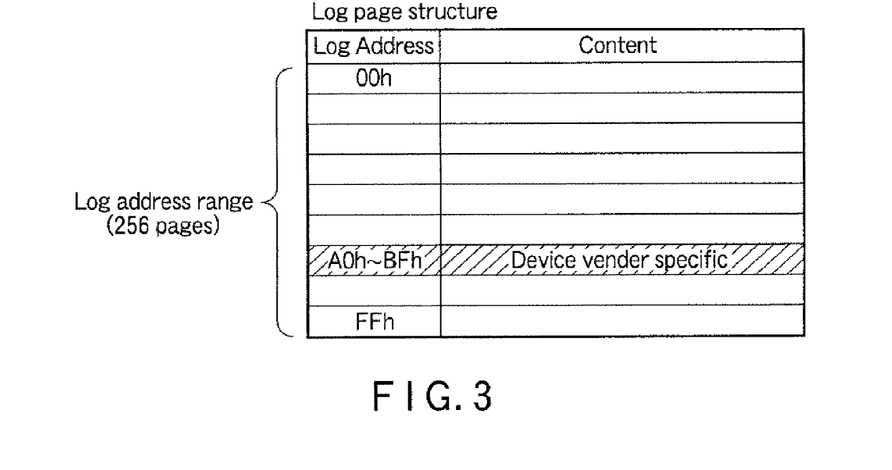
FIG. 3 shows an example of a log page structure which is stored in each of a plurality of drives provided in the storage device according to the embodiment.

The pass-through control register 300 includes a drive select register 301, a pass-through mode (PTM) register 302 and a page select register 303. For the access to the drive select register 301, pass-through mode (PTM) register 302 and page select register 303, use may be made of a SMART command for designating write of log data to a first vender-specific log address which belongs to a log address range allocated to a log page structure (SMART log page structure). The log page structure (SMART log page structure) is used for storing various log information such as a self-test result. As the SMART command for designating write of log data to the first vender-specific log address, use may be made of, for instance, a SMART WRITE LOG command to the first vender-specific log address, or a WRITE LOG EXT command to the first vender-specific log address. Specifically, as shown in FIG. 3, in the log page structure stored in each drive, a log address range (00h to FFh) is allocated, and the log page structure comprises 256 pages. Of the log address range (00h to FFh), A0h to BFh are vender specific addresses (pages). The vender specific address is an address which is reserved for the specific purpose of the manufacturer (vender) of the storage device 12. In the present embodiment, for example, a log address A0h (also referred to as "page A0h") is used as the first vender-specific log address, and a SMART write command to the log address A0h is used for access to the pass-through control register 300.

The access to the pass-through control register 300 can also be realized by using a vender specific command. However, some kind of driver software, which is executed by the host 11, or some kind of bridge device in the host 11, fails to support a vender specific command in which a command protocol is not defined. In the present embodiment, since a SMART command in which the protocol is defined is used for the access to the pass-through control register 300, high compatibility can be obtained.

The drive select register 301 is a register for storing the to-be-accessed drive number which is designated by the host 11.

The pass-through mode (PTM) register 302 is a register for storing an operation mode which is designated by the host 11. An example of the operation mode is the above-described pass-through mode for sending all kinds of commands from the host 11 to the drive that is designated by the to-be-accessed drive number. Other examples of the operation mode are a log page mode and a SMART READ DATA mode. In accordance with the value that is set in the pass-through mode (PTM) register 302 by the host 11, the operation mode of the RAID controller 201 is set to the pass-through mode, the log page mode or the SMART READ DATA mode.

The log page mode is a mode for reading/writing the log page structure (SMART information) by using a SMART command to a second vender-specific log address belonging to the log address range allocated to the log page structure (e.g. a SMART READ LOG command to the second vender-specific log address, or a SMART WRITE LOG command to the second vender-specific log address). In this case, a to-be-accessed page (log address) in the log page structure is designated by the to-be-accessed log address which is stored in the page select register 303.

For example, a log address A1h (also referred to as "page A1h") is used as the second vender-specific log address. Specifically, the page A1h is used as a window for the host 11 to access the log page structure of each drive.

The SMART READ DATA mode is a mode for reading the SMART data structure, which is the SMART information different from the above-described log page structure, by using a SMART command to the second vender-specific log address belonging to the log address range allocated to the log page structure (e.g. a SMART READ LOG command to the second vender-specific log address, or a SMART WRITE LOG command to the second vender-specific log address). In the SMART READ DATA mode, the page select register 303 is not used, and the entire SMART data structure is returned to the host 11.

Figure 4:
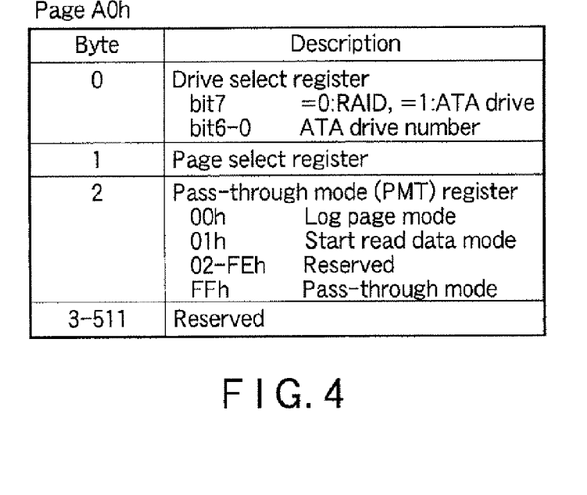
FIG. 4 shows a structure example of a pass-through control register provided in the storage device according to the embodiment.

FIG. 4 shows a structure example of the pass-through control register 300 which is allocated to the page A0h.

Of the data memory area of 512 bytes corresponding to page A0h, a data memory area corresponding to byte 0 is used as the drive select register 301. In Byte 0, bit7=0 indicates the RAID controller 201, and bit7=1 indicates the ATA drive. In Byte 0, bit6-0 indicates the to-be-accessed drive number (to-be-accessed ATA drive number). When bit7=1, the drive 210, which is designated by the ATA drive number indicated by bit6-0, is the object of access.

Of the data area of 512 bytes corresponding to the page A0h, the data area of byte 1 is used as the page select register 303. The value of 1-byte data, which is set in the data area of byte 1, indicates the to-be-accessed log address (to-be-accessed log page).

The data area of byte 2 in the data area of 512 bytes corresponding to the page A0h is used as the PTM register 302. In the data area of byte 2, 1-byte data=00h indicates the log page mode. In the data area of byte 2, 1-byte data=01h indicates the SMART READ DATA mode. In the data area of byte 2, 1-byte data=FFh indicates the pass-through mode.

The control module 400 receives a command from the host 11. If the received command is a SMART command which designates write of log data to the log page A0h, the control module 400 writes the data (512-byte log data) from the host 11 in the pass-through control register 300, thereby to set the to-be-accessed drive number, to-be-accessed log address or operation mode (log page mode, SMART READ DATA mode, pass-through mode) in the pass-through control register 300.

In the operation modes other than the pass-through mode, the DOWNLOAD MICROCODE command, and the SMART command to the log page A1h become the predetermined commands that are passed through to the drive 210. In other words, in the operation modes other than the pass-through mode, the commands that are passed through are only the DOWNLOAD MICROCODE command and the SMART command to the log page A1h.

Thus, the RAID controller 201 of the present embodiment can provide three kinds of direct access methods, namely, the direct access by the DOWNLOAD MICROCODE command (hereinafter referred to as "DLMC command"), the direct access by the SMART command and the direct access by the pass-through mode.

The RAID controller 201 is provided with the drive select register 301, page select register 303 and pass-through mode register (PTM register) 302, and the operation of the RAID controller 201 can be varied by the combination of values of these registers.

The pass-through control register 300 (drive select register 301, page select register 303 and PTM register 302) is cleared by power-on of the storage device 12 or software reset of the storage device 12. The default values of the pass-through control register 300 are all zeros.

The values of the pass-through control register 300 can be varied by the SMART WRITE LOG command to the page A0h from the host 11, or the WRITE LOG EXT command to the page A0h from the host 11.

Next, the pass-through control operation, which is executed by the RAID controller 201, is specifically described.

<Pass-Through Control to DLMC Command>

Figure 5:
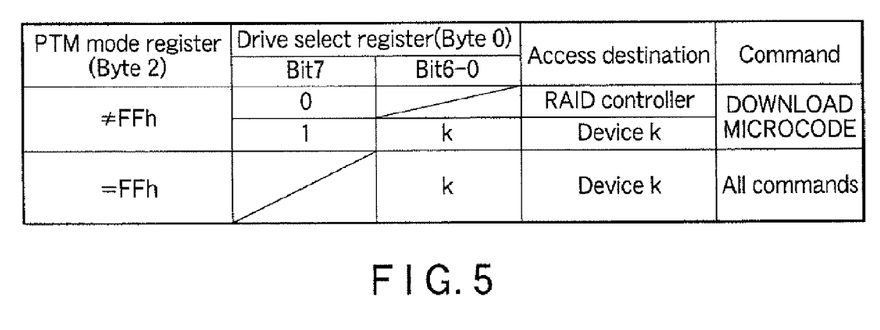
FIG. 5 is an exemplary view for explaining a pass-through control operation for a DOWNLOAD MICROCODE command, which is executed by the disk array controller provided in the storage device according to the embodiment.

As shown in FIG. 5, when the value of the PTM register 302 is not FFh, the pass-through control operation to the DLMC command is varied in accordance with the value of the drive select register 301.

In the case where the value of the PTM register 302 is not FFh, when the bit7 of the drive select register 301 is 0, the pass-through destination (access destination) of the DLMC command is the RAID controller 201 itself. Specifically, the microcode of the RAID controller 201 is varied. When the bit7 of the drive select register 301 is 1, the pass-through destination of the DLMC command is the ATA drive 210 which is designated by the ATA drive number that is indicated by the bit6-0 of the drive select register 301. For example, if the ATA drive number that is indicated by bit6-0 is k, the DLMC command is passed through to the drive 210 of the drive number k.

In the case where the value of the PTM register 302 is FFn, the value of the bit7 of the drive select register 301 is not used, and all commands from the host 11 are passed through to the ATA drive 210 which is designated by the ATA drive number that is indicated by bit6-0 of the drive select register 301.

<Pass-Though Control to SMART Command>

Figure 6:
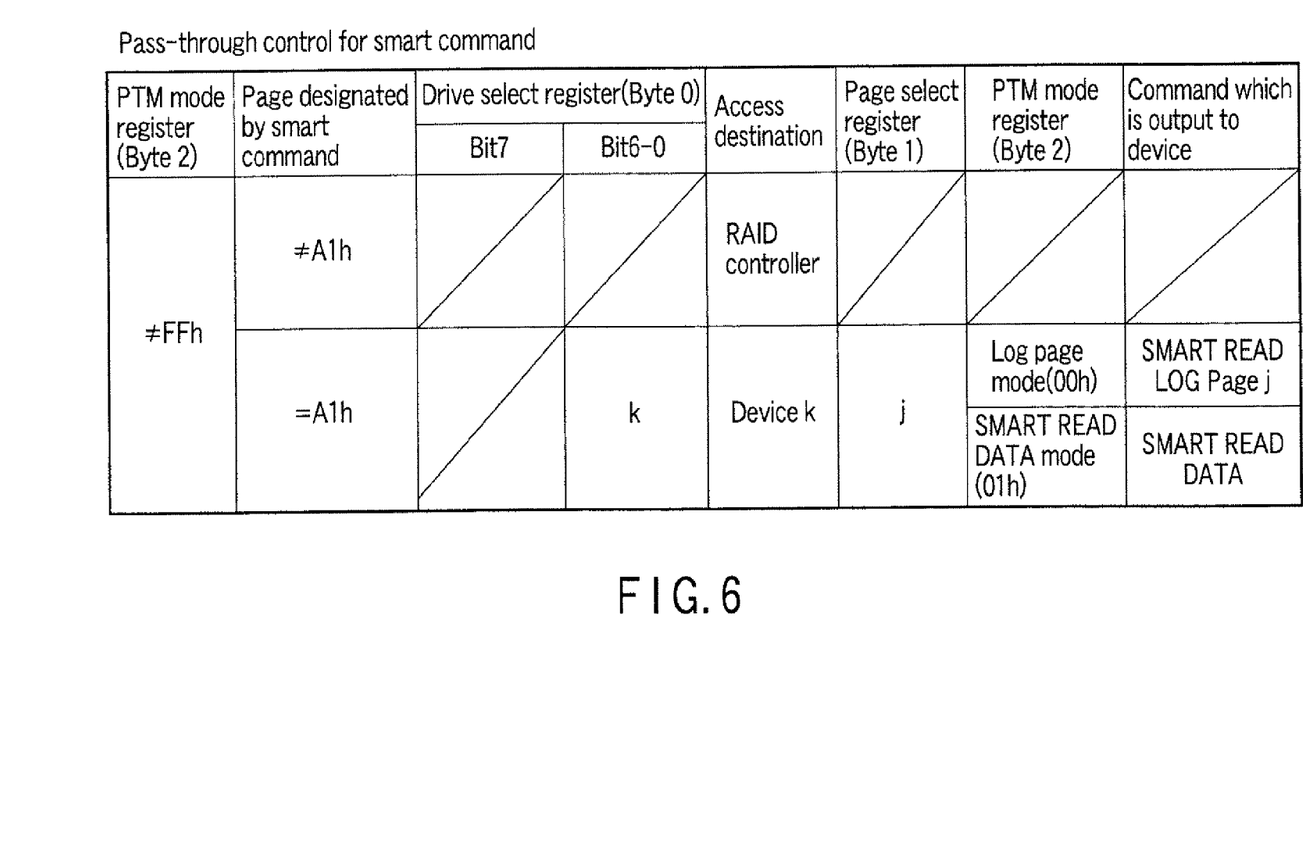
FIG. 6 is an exemplary view for explaining a pass-through control operation for a SMART command, which is executed by the disk array controller provided in the storage device according to the embodiment.

As shown in FIG. 6, when the value of the PTM register 302 is not FFh, the SMART command to the page A1h is passed through to the ATA drive 210 which is designated by the ATA drive number that is indicated by the bit6-0 of the drive select register 301. On the other hand, the SMART command to the pages other than the page A1h is passed through to the RAID controller 201 itself.

SMART commands include commands for executing read/write access to the log of a certain page in the log page structure (SMART READ LOG command, SMART WRITE LOG command, READ LOG EXT command, WRITE LOG EXT command), and a command for reading the SMART data structure (SMART READ DATA command). In the present embodiment, in each of the case of accessing the log page structure and the case of accessing the SMART data structure, the host 11 uses the SMART command to the page A1h.

To begin with, the access to the log page is described.

When the value of the PTM register 302 is 00h (log page mode), the host 11 can access the Log page of the ATA drive through the page A1h. The SMART READ LOG command to the page A1h or the SMART WRITE LOG command to the page A1h is passed through as a SMART READ/WRITE LOG command to the page number, which is indicated by the page select register 303, of the ATA drive that is designated by the ATA drive number indicated by the bit6-0 of the drive select register 301. For example, if the ATA drive number indicated by the bit6-0 of the drive select register 301 is k and the page number indicated by the page select register 303 is j, the SMART READ LOG command to the page number j or the SMART WRITE LOG command to the page number j is sent to the drive of the drive number k.

The READ LOG EXT command to the page A1h or the WRITE LOG EXT command to the page A1h is passed through as a READ/WRITE LOG EXT command to the page number, which is indicated by the page select register 303, of the ATA drive that is designated by the ATA drive number indicated by the bit6-0 of the drive select register 301. For example, if the ATA drive number indicated by the bit6-0 of the drive select register 301 is k and the page number indicated by the page select register 303 is j, the READ LOG EXT command to the page number j or the WRITE LOG EXT command to the page number j is sent to the drive of the drive number k.

Next, the access to the SMART data is described.

When the value of the PTM register 302 is 01h (SMART READ DATA mode), the host 11 can access the SMART data structure of the ATA drive through the page A1h.

The SMART READ LOG command to the page A1h or the READ LOG EXT command to the page A1h is passed through as a SMART READ DATA command to the ATA drive that is designated by the ATA drive number indicated by the bit6-0 of the drive select register 301. Specifically, the SMART READ LOG command to the page A1h or the READ LOG EXT command to the page A1h is converted to the SMART READ DATA command by the RAID controller 201. If the ATA drive number indicated by the bit6-0 of the drive select register 301 is k, the SMART READ DATA command is sent to the drive of the drive number k.

<Pass-Through Control in the Pass-Through Mode>

When the value of the PTM register 302 is FFn (pass-through mode), all commands are passed through to the ATA drive which is designated by the ATA drive number that is indicated by bit6-0 of the drive select register 301.

In order to cancel the pass-through mode, software reset is used. The reason for this is that after the operation mode is once set to the pass-through mode, all commands including the SMART command to the page A0h are passed through, and thus the content of the pass-through control register 300 cannot be updated by the command from the host 11.

Figure 7:
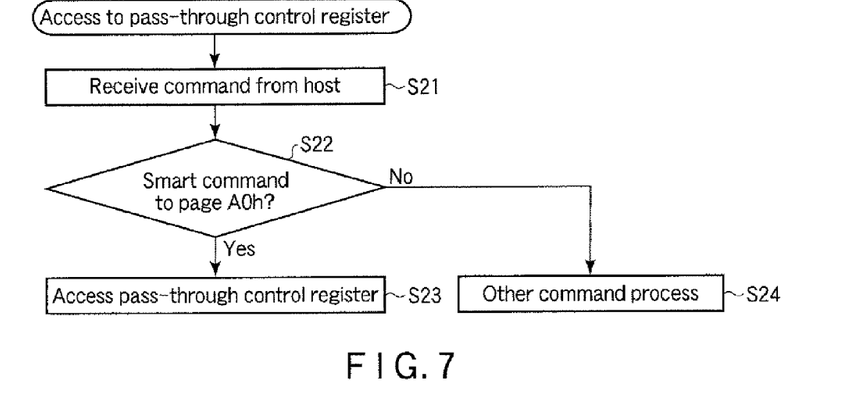
FIG. 7 is an exemplary flow chart for describing an example of the procedure of an access process for a pass-through control register in the storage device, which is executed by the disk array controller provided in the storage device according to the embodiment.

Next, referring to a flow chart of FIG. 7, a description is given of the access process to the pass-through control register 300, which is executed by the control module 400.

The control module 400 receives a command which is sent from the host 11 (block S21). The control module 400 determines whether the received command is a SMART command which designates write of log data to the page A0h (block S22). If the received command is the SMART command which designates write of log data to the page A0h, the control module 400 write-accesses the pass-through control register 300, and writes the log data from the host 11 to the pass-through control register 300 (block S23). If the received command is not the SMART command which designates write of log data to the page A0h, the control module 400 executes some other process (command process) (block S24).

Figure 8:
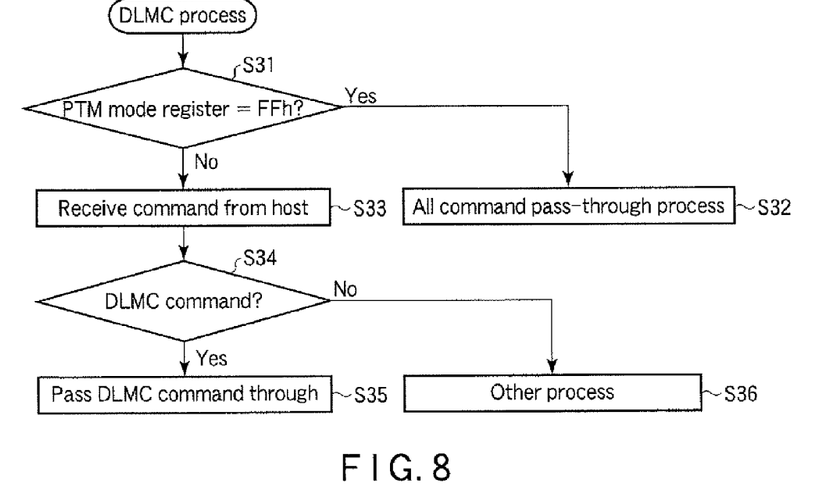
FIG. 8 is an exemplary flow chart for describing an example of the procedure of a pass-through control process for a DOWNLOAD MICROCODE command, which is executed by the disk array controller provided in the storage device according to the embodiment.

Next, referring to a flow chart of FIG. 8, a description is given of the pass-through control process to the DLMC command, which is executed by the control module 400.

The control module 400 determines whether the value of the PTM register 302 is FFh or not (block S31). If the value of the PTM register 302 is FFh, that is, if the operation mode of the RAID controller 201 is the pass-through mode, the control module 400 passes all commands from the host 11 through to the ATA drive which is indicated by the bit6-0 of the drive select register 301 (block S32).

On the other hand, if the value of the PTM register 302 is not FFh, the control module 400 determines, each time the control module 400 receives a command from the host 11, whether the received command is a DLMC command or not (block S33, S34). If the received command is the DLMC command, the control module 400 passes the received command through to the ATA drive which is designated by the ATA drive number indicated by the bit6-0 of the drive select register 301 (block S35). On the other hand, if the received command is a command other than the DLMC command, the control module 400 executes some other process (block S36).

Figure 9:
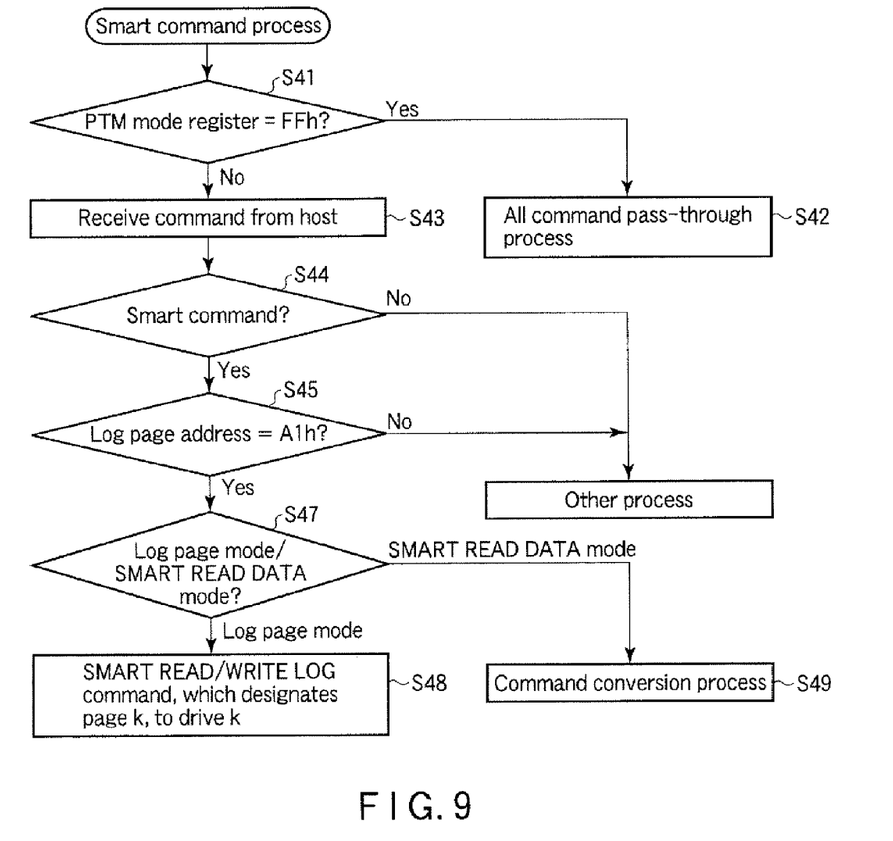
FIG. 9 is an exemplary flow chart for describing an example of the procedure of a pass-through control process for a SMART command, which is executed by the disk array controller provided in the storage device according to the embodiment.

Next, referring to a flow chart of FIG. 9, a description is given of the pass-through control process to the SMART command, which is executed by the control module 400.

The control module 400 determines whether the value of the PTM register 302 is FFh or not (block S41). If the value of the PTM register 302 is FFh, that is, if the operation mode of the RAID controller 201 is the pass-through mode, the control module 400 passes all commands from the host 11 through to the ATA drive which is designated by the ATA drive number indicated by the bit6-0 of the drive select register 301 (block S42).

On the other hand, if the value of the PTM register 302 is not FFh, the control module 400 determines, each time the control module 400 receives a command from the host 11, whether the received command is a SMART command to the page A1h (the SMART READ LOG command to the page A1h, the SMART WRITE LOG command to the page A1h, the READ LOG EXT command to the page A1h, or the WRITE LOG EXT command to the page A1h) (block S44, S45).

If the received command is the SMART command to the page A1h, the control module 400 passes the SMART command for accessing the log page structure or the SMART data structure through to the ATA drive which is designated by the ATA drive number indicated by the bit6-0 of the drive select register 301 (blocks S47 to S49). Specifically, in blocks S47 to S49, for example, the control module 400 determines whether the operation mode is the log page mode or the SMART READ DATA mode (block S47). If the operation mode is the log page mode, the control module 400 sends the SMART command to the page number j that is indicated by the page select register 303 (the SMART READ LOG command to the page j, the SMART WRITE LOG command to the page j, the READ LOG EXT command to the page j, or the WRITE LOG EXT command to the page j) to the drive of the drive number k that is indicated by the bit6-0 of the drive select register 301 (block S48). In the case where the operation mode is the SMART DATA READ mode, the control module 400 executes a process of converting the SMART READ LOG command to the page A1h or the READ LOG EXT command to the page A1h to the SMART READ DATA command (block S49). Specifically, in the case where the received command is the SMART READ LOG command to the page A1h or the READ LOG EXT command to the page A1h and the operation mode is the SMART DATA READ mode, the control module 400 sends the SMART READ DATA command to the drive of the drive number k that is indicated by the bit6-0 of the drive select register 301.

Figure 10:
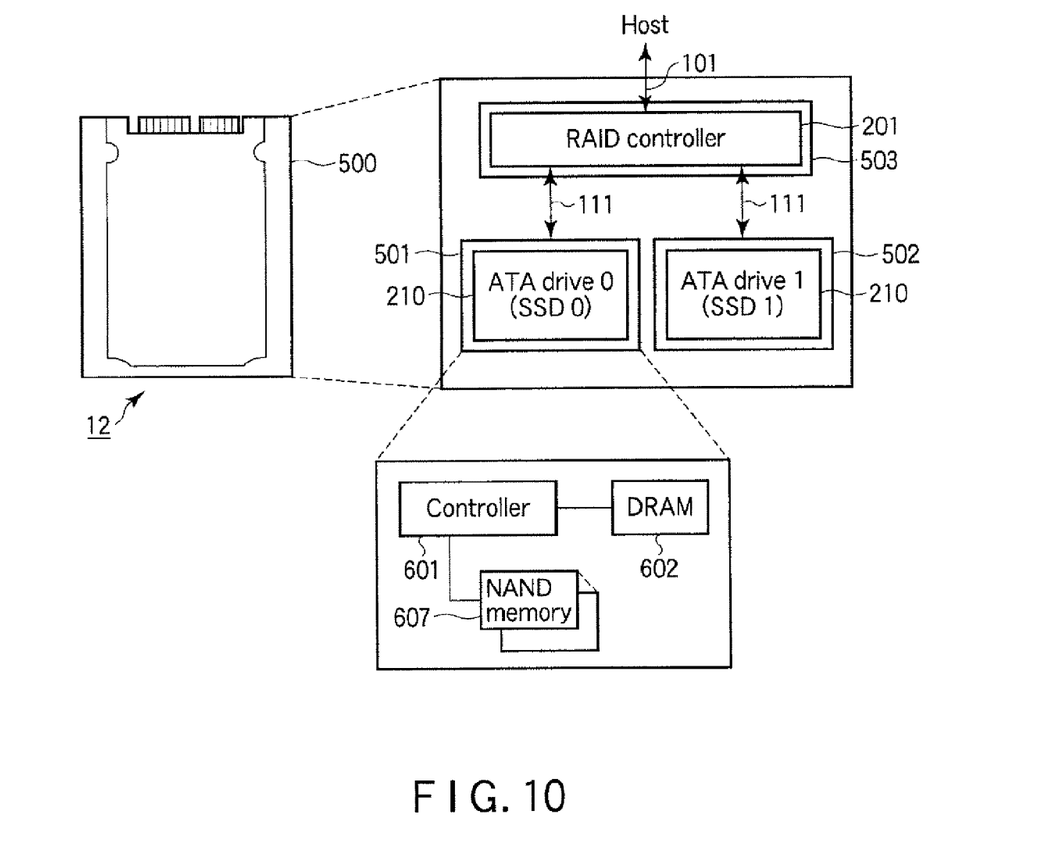
FIG. 10 shows an example of implementation of the storage device according to the embodiment.

FIG. 10 shows an example of implementation of the storage device 12.

FIG. 10 assumes the case in which the storage device 12 is realized as a semiconductor disk drive incorporating a plurality of SSDs, e.g. two SSDs. The storage device 12 has a housing 500 with the same outside dimensions as, e.g. a 2.5-inch HDD. The housing 500 includes a circuit board 503 on which the RAID controller 201 is mounted, and two circuit boards 501 and 502 on which two SSDs 210 are mounted, respectively. The RAID controller 201 controls the two SSDs 210 as a disk array of, e.g. RAID level 0. In the case where the memory capacity of each SSD 210 is 128 GB, the RAID controller 201 can handle the two SSDs 210 as a single SSD having a memory capacity of 256 GB. The host 11 recognizes the storage device 12 as a single SSD (ATA drive) with a memory capacity of 256 GB.

Each SSD 210 comprises a controller 601, a DRAM 602 and a plurality of nonvolatile semiconductor memories 607. Each of the nonvolatile semiconductor memories 607 is composed of, e.g. a NAND flash EEPROM. It is possible that the RAID controller 201 and the two SSDs 210 are mounted on a single circuit board.

In the storage device 12 with the structure as shown in FIG. 10, it is practically difficult to remove each SSD 210 from the housing 500. Since the pass-through control function of the present embodiment can execute the pass-through process for only the command relating to the drive maintenance, such as a DLMC command or a SMART command, it is possible to perform a process for the maintenance of an arbitrary SSD 210 (collection of SMART information, update of firmware), without removing each SSD 210 from the housing 500 or affecting user data that is distributively recorded in the two SSDs 210, even in the state in which the operating system is running.

Figure 11:
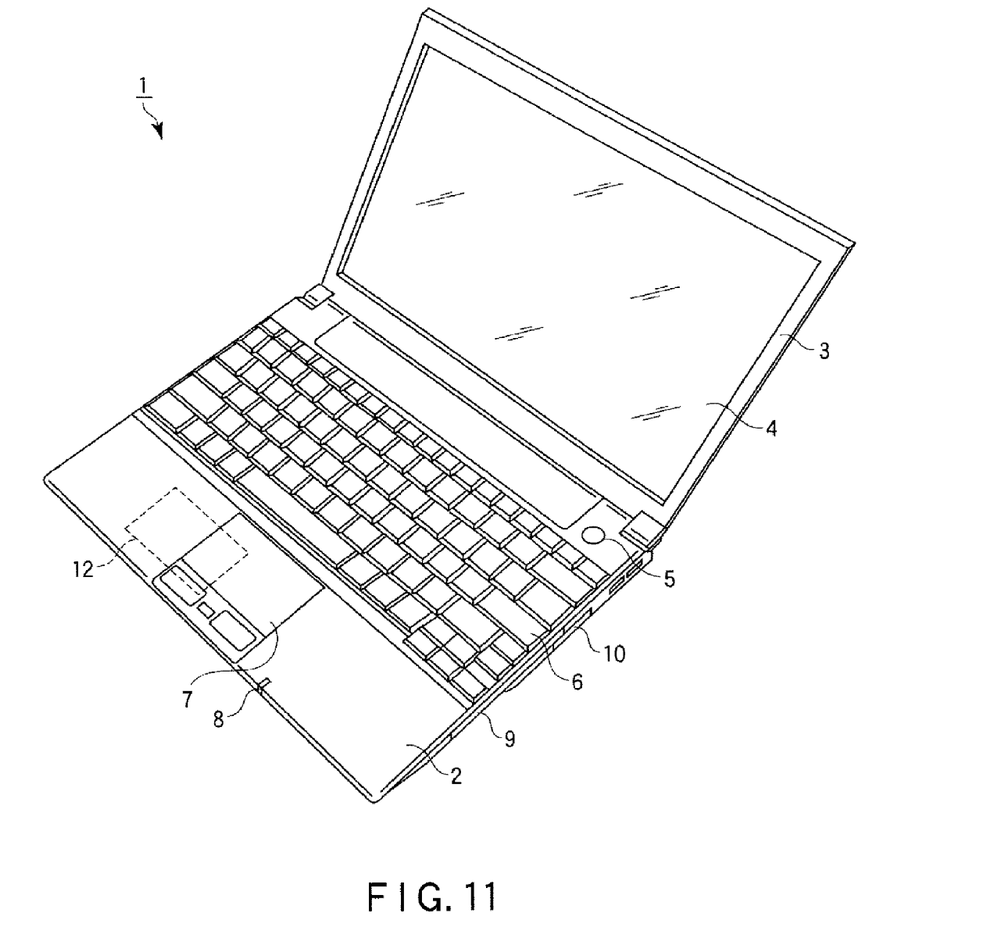
FIG. 11 is an exemplary perspective view showing the external appearance of an information processing apparatus including a main body in which the storage device according to the embodiment is accommodated.

Next, referring to FIG. 11, a description is given of a structure example of the information processing apparatus 1 which includes the storage device 12.

The information processing apparatus 1 can be realized, for example, as a notebook portable computer. FIG. 11 is a perspective view showing the external appearance of the information processing apparatus 1 that is realized as a portable computer.

The information processing apparatus 1 comprises an information processing apparatus main body 2 and a display unit 3. A display device that is composed of an LCD (Liquid Crystal Display) 4 is built in the display unit 3.

The display unit 3 is attached to the information processing apparatus main body 2 such that the display unit 3 is freely rotatable between an open position where a top surface of the main body 2 is exposed, and a closed position where the top surface of the main body 2 is covered. The main body 2 has a thin box-shaped housing. A power switch 5, a keyboard 6 and a touch pad 7 are disposed on the top surface of the main body 2.

An LED (Light Emitting Diode) 8 is disposed on a front surface of the main body 2. On the right side surface of the main body 2, there are disposed an optical disc drive (ODD) 9 which can write/read data in/from optical disc media such as a DVD (Digital Versatile Disc), and a PC card slot 10 which detachably accommodates a PC card. In the information processing apparatus 1, the storage device 12 according to the present embodiment is accommodated in the main body 2 as an external storage device which functions as a boot drive. The storage device 12 is realized, for example, as a semiconductor disk drive having the structure as described with reference to FIG. 10. The information processing apparatus main body 2 functions as the above-described host 11.

Figure 12:
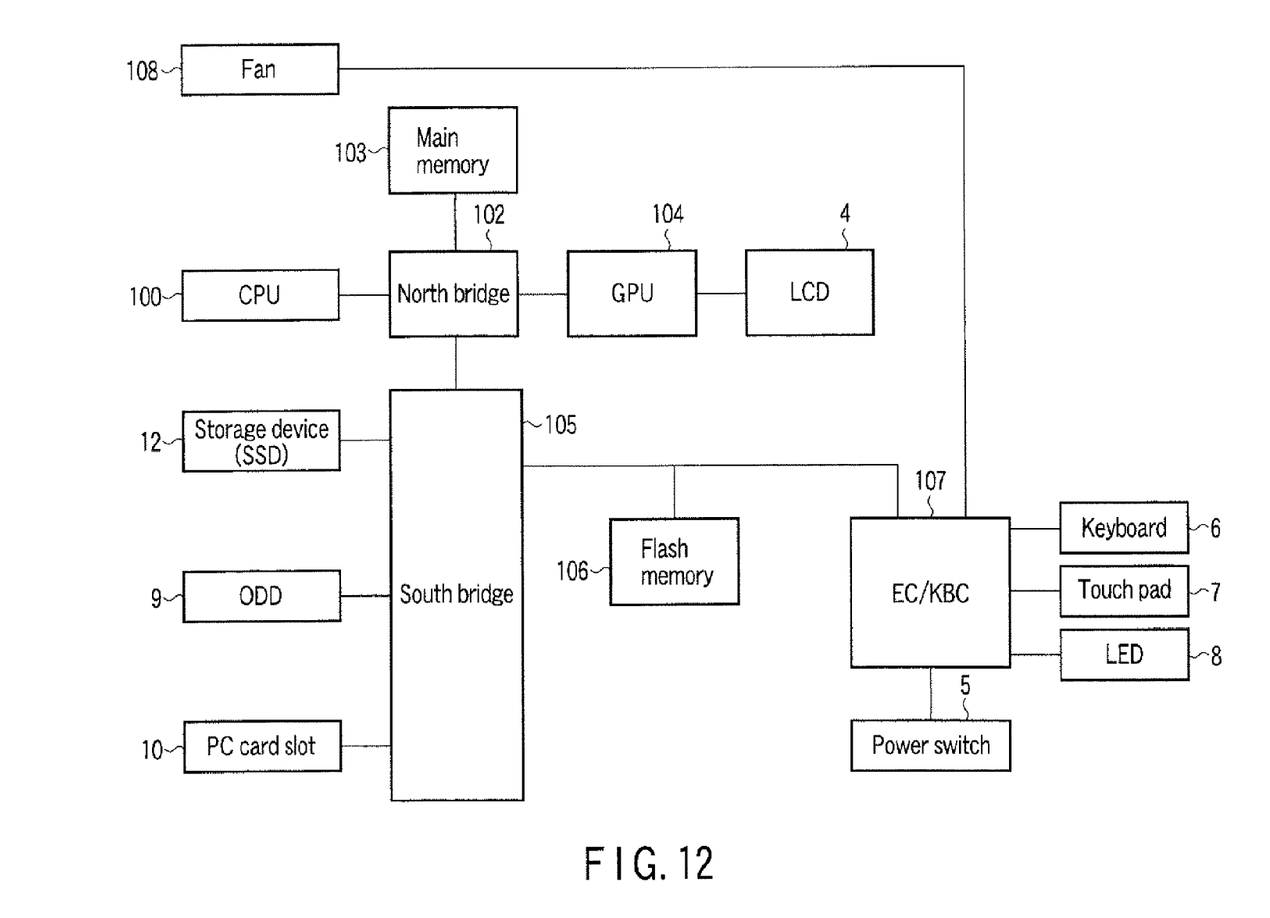
FIG. 12 is an exemplary block diagram showing the structure of the information processing apparatus shown in FIG. 11.

FIG. 12 is a block diagram showing the system configuration of the information processing apparatus 1 shown in FIG. 11.

As shown in FIG. 12, the information processing apparatus 1 includes, in addition to the above-described LCD 4, power switch 5, keyboard 6, touch pad 7, LED 8, ODD 9, PC card slot 10 and storage device 12, a CPU 100, a north bridge 102, a main memory 103, a GPU (Graphic Processing Unit) 104, a south bridge 105, a flash memory 106, an EC/KBC (Embedded Controller/Keyboard Controller) 107, and a fan 108.

The CPU 100 is a processor which controls the operation of the information processing apparatus 1. The CPU 100 executes an operating system and various application programs including utilities, which are loaded from the storage device 12 into the main memory 103. The CPU 100 also executes a BIOS (Basic Input/Output System) that is stored in the flash memory 106. The BIOS is a program for hardware control.

The north bridge 102 is a bridge device that connects a local bus of the CPU 100 and the south bridge 105. The north bridge 102 has a function of executing communication with the GPU 104 via a bus, and includes a memory controller that access-controls the main memory 103. The GPU 104 controls the LCD 4 that is used as a display device of the information processing apparatus 1.

The south bridge 105 is a controller that controls various devices such as the storage device 12, ODD 9, a PC card which is loaded in the PC card slot 10, and flash memory 106.

The EC/KBC 107 is a 1-chip microcomputer in which an embedded controller for power management and a keyboard controller for controlling the keyboard 6 and touch pad 7 are integrated. The EC/KBC 107 also executes control of the LED 8 and the fan 108 for cooling.

As has been described above, according to the command pass-through control function of the present embodiment, the following advantageous effects can be obtained.

Specifically, in a general RAID system, each individual drive cannot directly be accessed. In the present embodiment, however, maintenance functions, such as the update of firmware and collection of SMART information, can be realized in fields in each individual drive. In this case, in the modes other than the pass-through mode (PTM register=FFh), the command pass-through control function of the present embodiment affects only the operations of the DLMC command, the SMART READ/WRITE LOG command to the page A1h, and the READ/WRITE LOG EXT command to the page A1h. Therefore, even during the period in which the operating system is running, the maintenance process, such as the update of firmware and collection of SMART information, can easily be executed for each individual drive.

In addition, since the SMART command in which the protocol is defined is used for the access to the pass-through control register 300, high compatibility with various hosts can be realized.

The implementation of the pass-through mode (PTM register=FFh) may optionally be adopted.

The page number, the arrangement of data and the meanings of values in the present embodiment are mere examples, and other definitions may be adopted within the scope of the present invention.

The storage device 12 may also be realized as a storage device such as a NAS (network-attached storage) device.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk array control device adapted to manage a plurality of drives as a single logical drive, the disk array control device being coupled to a host via a first interface operating in accordance with a first standard and coupled to the plurality of drives via a plurality of second interfaces each operating in accordance with the first standard, comprising:
a first register configured to store a value designated by the host, the value indicating a destination device to which a predetermined command is to be passed, the predetermined command being used for maintenance of the disk array control device or maintenance of at least one of the plurality of drives, the destination device being either the disk array control device or any one of the plurality of disk drives, an initial value of the value stored in the first register indicating the disk array control device, wherein the value stored in the first register is set to the initial value when the first register is cleared; and
a control module configured to (i) receive a command from the host, (ii) determine whether the received command is the predetermined command, (iii) execute a RAID control process for executing a data read among the plurality of drives if the received command is a data read command or a data write among the plurality of drives if the received command is a data write command, (iv) perform, in a case where the received command is the predetermined command and the value stored in the first register indicates one of the plurality of drives, a pass-through process of sending the received command which is the predetermined command to the one of the plurality of drives, and (v) execute the predetermined command in order to perform an operation for maintenance of the disk array control device in a case where the received command is the predetermined command and the value stored in the first register indicates the disk array control device.

2. The disk array control device according to claim 1, wherein the predetermined command is a DOWNLOAD MICROCODE command which enables the host to vary a microcode of the disk array control device or a microcode of any one of the plurality of drives.

3. The disk array control device according to claim 2, wherein each of the plurality of drives stores a log page structure, and
in a case where the received command is a SMART command which designates a write of log data to a first predetermined vender-specific log address belonging to a log address range which is allocated to the log page structure, the control module writes data from the host to the first register, thereby to set the value indicating the disk array control device or one of the plurality of drives in the first register.

4. The disk array control device according to claim 3, further comprising a second register configured to store a to-be-accessed log address which is designated by the host,
wherein in a case where the command received from the host is a SMART command which designates read or write of log data to a second predetermined log address in the log address range which is allocated to the log page structure, the control module sends the SMART command, which designates read or write of log data to the to-be-accessed log address of the second register, to the one of the plurality of drives which is indicated by the value stored in the first register.

5. The disk array control device according to claim 1, further comprising a register configured to store an operation mode which is designated by the host,
wherein in a case where the operation mode is a pass-through mode for sending all kinds of commands from the host to the one of the plurality of drives which is indicated by the value stored in the first register, the control module sends each of the commands, which are received from the host, to one of the plurality of drives which is indicated by the value stored in the first register.

6. The disk array control device according to claim 1, wherein the first interface operating in accordance with an Advanced Technology Advancement (ATA) standard.

7. The disk array control device according to claim 1, wherein the control module either (i) executes the command or (ii) passes the command in accordance with the value of the first register without use of a dedicated operating mode.

8. A storage device comprising:
a housing;
a plurality of drives provided in the housing; and
a disk array control device provided in the housing and configured to manage the plurality of drives as a single logical drive, the disk array control device being coupled to a host via a first interface and being coupled to the plurality of drives via a plurality of second interfaces, the first interface and each of the plurality of second interfaces operating in accordance with a predetermined standard, the disk array control device including (i) a first register configured to store a value designated by the host, the value indicating a destination device to which a predetermined command is to be passed, the predetermined command being used for maintenance of the disk array control device or maintenance of at least one of the plurality of drives, the destination device being either the disk array control device or any one of the plurality of disk drives, an initial value of the value stored in the first register indicating the disk array control device, wherein the value stored in the first register is set to the initial value when the first register is cleared, and (ii) a control module configured to receive a command, to determine whether the received command is the predetermined command, to execute a RAID control process for executing a data read the plurality of drives if the received command is a data read command or a data write among the plurality of drives if the received command is a data write command, to perform, in a case where the received command is the predetermined command and the value stored in the first register indicates one of the plurality of drives, a pass-through process of sending the received command which is the predetermined command to the one of the plurality of drives, and to execute the predetermined command in order to perform an operation for maintenance of the disk array control device in a case where the received command is the predetermined command and the value stored in the first register indicates the disk array control device.

9. The storage device according to claim 8, wherein the predetermined command is a DOWNLOAD MICROCODE command which is used by the host in order to vary a microcode of the disk array control device or a microcode of any one of the plurality of drives.

10. The storage device according to claim 9, wherein each of the plurality of drives stores a log page structure, and
in a case where the command received from the host is a SMART command which designates write of log data to a first predetermined log address in a log address range which is allocated to the log page structure, the control module writes data from the host to the first register, thereby to set the value indicating one of the plurality of drives in the first register.

11. The storage device according to claim 8, wherein each of the plurality of drives is a semiconductor drive including a nonvolatile memory and a controller which controls access to the nonvolatile memory in accordance with a command from the disk array control device.

12. The storage device according to claim 8, wherein the first interface operating in accordance with an Advanced Technology Advancement (ATA) standard.

13. An information processing apparatus comprising:
an information processing apparatus main body; and
a storage device provided in the information processing apparatus main body, the storage device includes
a housing,
a plurality of drives provided in the housing, and
a disk array control device which is provided in the housing and manages the plurality of drives as a single logical drive, the disk array control device being coupled to the information processing apparatus main body via a first interface and being coupled to the plurality of drives via a plurality of second interfaces, the first interface and each of the second interfaces operating in accordance with a first standard, the disk array control device including (a) a first register configured to store a value designated by the information processing apparatus main body, the value indicating a device that is to be accessed and to receive a predetermined command, the predetermined command being used for maintenance of the disk array control device or maintenance of at least one of the plurality of drives, the device to be accessed being either the disk array control device or any one of the plurality of disk drives an initial value of the value stored in the first register indicating the disk array control device, wherein the value stored in the first register is set to the initial value when the first register is cleared, and (b) a control module being configured to (i) receive a command from the information processing apparatus main body, (ii) determine whether the received command is the predetermined command which is used for maintenance of the disk array control device or maintenance of at least one of the plurality of drives, (iii) execute a RAID control process for executing data read or data write among the plurality of drives if the received command is a data read command or a data write command, (iv) perform, in a case where the received command is the predetermined command and the value stored in the first register indicates one of the plurality of drives, a pass-through process of sending the received command which is the predetermined command to the one of the plurality of drives, and (v) execute the predetermined command in order to perform an operation for maintenance of the disk array control device in a case where the received command is the predetermined command and the value stored in the first register indicates the disk array control device.

14. The information processing apparatus according to claim 13, wherein the first interface for communications with the disk array control device operating in accordance with an Advanced Technology Advancement (ATA) standard.

* * * * *